Figure 1:
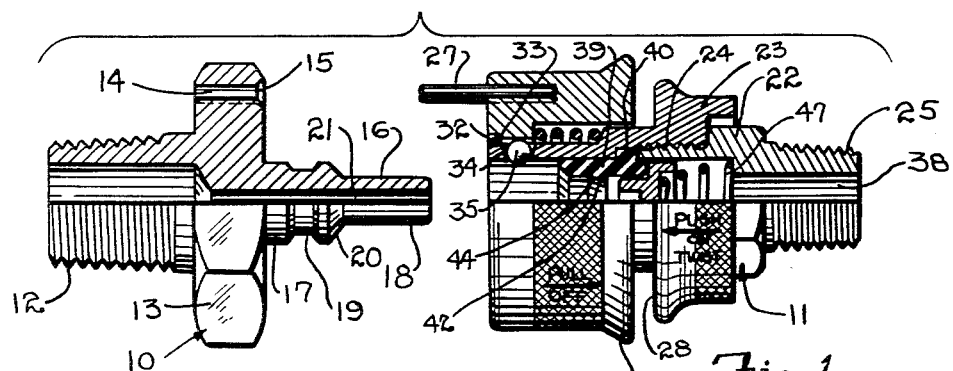

May 3, 1960

J. W. MILLS, JR 2,935,338

QUICK COUPLING

Filed May 31, 1957

2 Sheets-Sheet 1

INVENTOR.
Justin W. Mills Jr.
BY
Watson D. Harbaugh
Atty.

May 3, 1960   J. W. MILLS, JR   2,935,338
QUICK COUPLING
Filed May 31, 1957   2 Sheets-Sheet 2

INVENTOR.
Justin W. Mills Jr.
BY
Watson D Harbaugh
Atty.

United States Patent Office 2,935,338
Patented May 3, 1960

2,935,338

QUICK COUPLING

Justin W. Mills, Jr., Skokie, Ill., assignor to The Bastian-Blessing Company, Chicago, Ill., a corporation of Illinois Application May 31, 1957, Serial No. 662,764

10 Claims. (Cl. 284—19)

This invention relates to quick couplings—that is, couplings which can be connected and disconnected rapidly, with a minimum number of simple manual movements. Though the invention has general utility in environments where such couplings are desired, a useful embodiment thereof is a quick coupling valve which may be employed in connection with syrup tanks such as, for example, those found in soda fountains.

There are many applications for a quick-connect disconnect coupling. In soda fountains, as an example, it is necessary to repeatedly connect and disconnect gas and syrup lines with syrup tanks since such tanks must be replaced or refilled when the contents thereof are depleted. Though quick couplings have been known heretofore, those in use have been to a considerable extent either complex, difficult to manipulate, expensive or unreliable, especially where the couplings combine a valve structure and valving function. Such combinative valve couplings are desirable in soda fountain apparatus for it is necessary to terminate the flow and prevent the escape of gas (usually carbon dioxide) when the gas line is disconnected from the flavoring tanks.

As a consequence of the deficiencies of the known structures, an improved type of quick coupling and quick coupling valve would be an important contribution to this art, and it is an object of this invention to provide the same. Another object of the invention is that of providing a quick coupling which may be connected and disconnected with one hand by means of a simple manual movement, and wherein such coupling preferably incorporates one or more valves to terminate the flow of pressure fluid when the coupling is disconnected.

Still another object is in the provision of a valve coupling having a double check feature—that is, a valve in each of the separable coupling sections which automatically closes when the sections are disconnected, and which automatically opens upon recoupling thereof. Yet another object is to provide a quick coupling having indexing or polarizing means to prevent undesirable cross-connecting, and to enforce the requisite connection of paired coupling sections and in a predetermined relation with respect to each other.

Yet another object is that of providing a quick coupling having a connector telescopically receivable within the coupling body, and in which these members are constructed and arranged so that the interlocking elements provided by the coupling body do not touch the portions of the connector which contact a relatively soft gasket or seal within the connector body, thereby preserving the smoothness and original shape and finish of the sealing surfaces and permitting at the same time a strong, rugged connector throughout the area thereof mechanically engaged by the interlocking elements of the coupling body.

Still another object is in the provision of a coupling assembly of the character described which automatically accommodates variations in the size or shape of the coactive elements thereof, as well as misalignments of the mating parts resulting from rough handling, etc. A further object is that of providing a coupling assembly wherein the connector section thereof is a simple one-piece element which can be immersed and otherwise handled with the syrup tank to which it is attached, in any cleaning and washing operation; and wherein the more delicate or precisely movable elements of the coupling comprise a part of the gas delivery line which does not need frequent attention for cleaning or washing. Additional objects and advantages of the invention will become apparent as the specification develops.

Embodiments of the invention are illustrated in the accompanying drawings, in which—

Figure 2:
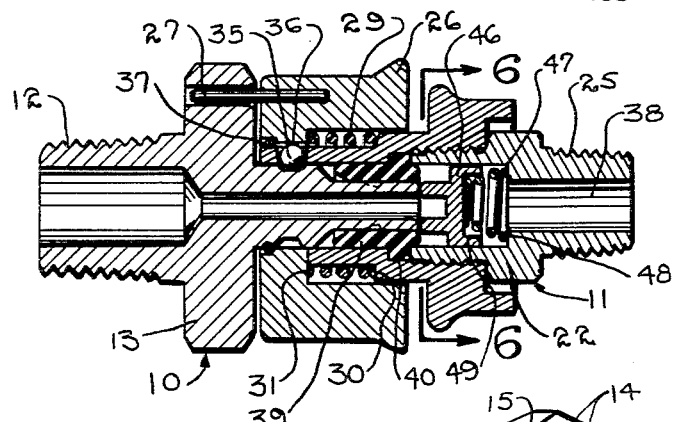
Figure 3:
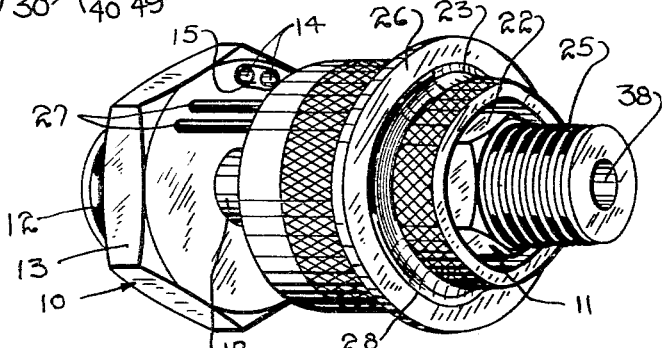
Figure 4:
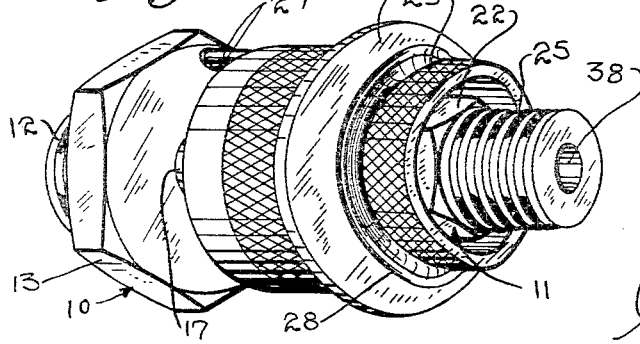
Figure 7:
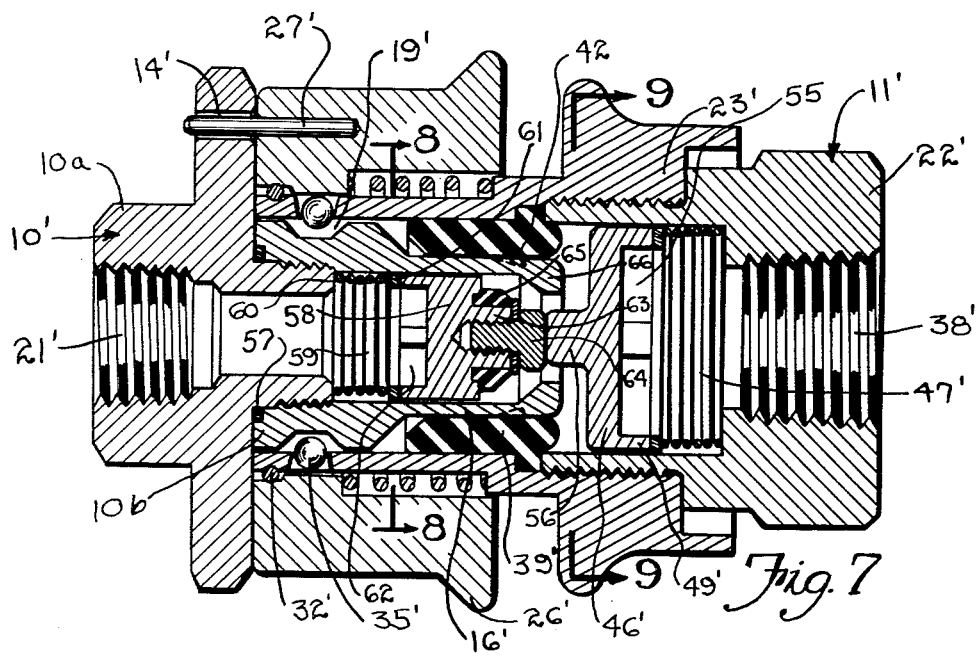
Figures 8, 9:
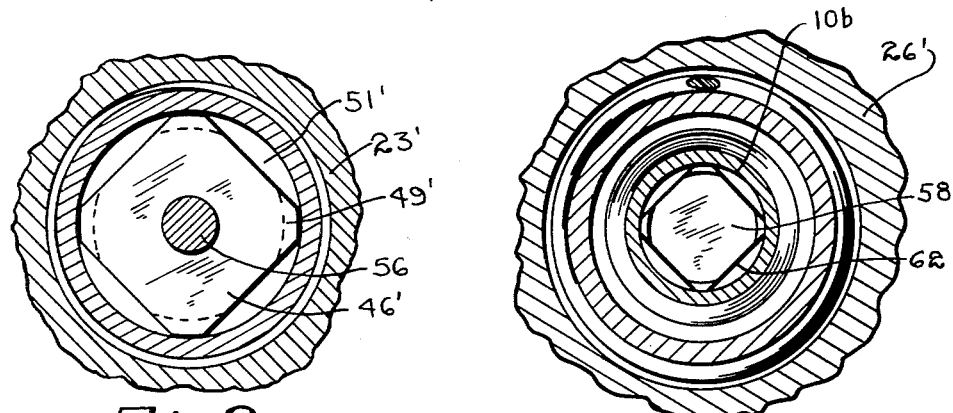
Figures 5, 6:
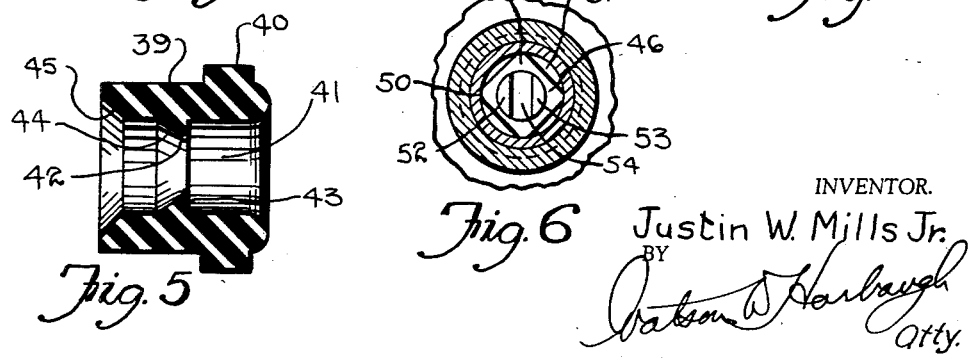

Figure 1 is a longitudinal sectional view, partly in elevation, showing a quick coupling embodying the invention with the components thereof arranged in spaced apart relation; Figure 2 is a longitudinal sectional view corresponding to that of Figure 1, but in which the components are illustrated in assembled relation; Figure 3 is a perspective of the quick coupling illustrated in Figures 1 and 2, showing the step in connecting the components thereof; Figure 4 is a perspective view similar to that of Figure 3, but with the components rotated slightly from their relative positions in Figure 3 to align the indexing means thereof which is a subsequent stage of the coupling operation; Figure 5 is an enlarged longitudinal sectional view of the gasket or seal element employed in the quick coupling of Figures 1 through 4; Figure 6 is a transverse sectional view taken along the line 6—6 of Figure 2; Figure 7 is a longitudinal sectional view of a modified form of quick coupling assembly; Figure 8 is a transverse sectional view taken along the line 8—8 of Figure 7; and Figure 9 is a transverse sectional view taken along the line 9—9 of Figure 7.

The coupling assembly illustrated in Figure 1 comprises a connector 10 and coupling 11. The connector 10 has an enlarged, externally threaded end 12 adapted to be secured directly or indirectly to a syrup tank (not shown), and adjacent the inner end of the threaded portion 12 is an enlarged flange defining a nut 13 to enable the connector to be turned in tightening the threaded portion 12. The nut 13 has one or more indexing passages 14 extending transversely therethrough. In the specific illustration, a pair of spaced indexing passages 14 are provided, and intermediate those passages along one face of the nut 13 is a depressed area 15, the purpose of which will be described in detail hereinafter.

Extending outwardly from that face of the nut 13 is a nipple 16, enlarged adjacent the face of the nut 13 as shown at 17, and reduced at its outer end as shown at 18. The enlarged section of the nipple has a generally V-shaped groove or recess 19 extending annularly thereabout, and an inclined shoulder 20 defines the merger of the enlarged and reduced sections of the nipple. It is apparent that a flow passage 21 extends completely through the connector so as to permit the unrestricted flow of fluid therethrough.

The coupling 11 has a sectioned body or casing formed by the portions or sections 22 and 23 that are, respectively, threaded externally and internally, as shown at 24, so as to permit the same to be secured together in longitudinal alignment. The outer end of the body section 22 is equipped with external threads 25 to permit the same to be secured to a fluid pressure line (not shown) such as a line which carries carbon dioxide to a syrup tank. The section 23 at its outer end coaxially receives a retaining ring 26 that, for convenience in handling, may be externally knurled, and which is equipped with one or more indexing pins 27 extending outwardly therefrom that are alignable with the indexing passages 14 in the connector nut 13 and are adapted to extend therethrough. There are two pins 27 in the illustration, and these are telescopically extensible through the two passages 14, as will be described in greater detail hereinafter.

The retaining ring 26 is longitudinally movable along the body section 23, and the extent of its movement toward the right (as viewed in Figure 1) is limited by an annular stop 28 provided by the body section. The ring is biased or urged away from such stop, and toward the left as seen in Figure 1, by a helical spring 29 which bears at one end against a spring seat 30 provided by the body section, and at its other end against a corresponding springseat 31 provided by the retaining ring. The ring is confined in coaxial relation about the body section 23 by means of a snap ring 32 that fits within a shallow annular recess extending circumferentially about the end of the body section 23, and which bears against a stop shoulder 33 formed on the retaining ring.

It will be seen that the body section 23 inwardly of the snap ring 32 is provided with a plurality of apertures or sockets 34 therein, arranged in spaced apart relation and which are generally semi-spherical in transverse section so as to nest the spherical retaining balls 35 therein. The balls 35 have a slightly smaller diametric dimension than the sockets or recesses 34, so that a portion of each ball extends inwardly of the body section and is adapted to seat within the annular recess 19 provided by the nipple of the connector 10.

In the position of the retaining ring 26 shown in Figure 1, the clearance between it and the body section adjacent the balls 35 is not sufficient so as to permit the balls to be pushed outwardly or to be retracted completely into the sockets 34; and in fact, the annular wall 36 of the retaining ring will bear against the locking balls and rigidly prevent such retraction. On the other hand, when the retaining ring 26 is moved axially with respect to the body section 23 to bring the enlarged mouth 37 of the retaining ring into alignment with the locking balls 35, as shown in Figure 2, sufficient clearance exists to permit the balls 35 to be completely retracted into their sockets and permit insertion of the nipple 16 of the connector into the coupling body.

The body sections 22 and 23 define a continuous flow passage 38 extending longitudinally therethrough; and mounted within the flow passage, and more particularly at the juncture of the body sections, is a seal or gasket 39 which has an outwardly extending annular locking flange 40 that is received between adjacent facing surfaces provided respectively by the body sections 22 and 23, and is sealingly confined therebetween when the body sections are threaded together.

Referring to Figure 5 which shows the gasket or seal-member in enlarged detail, it will be noted that the gasket has a flow passage 41 extending axially therethrough, and intermediate the ends of that passage is an inwardly projecting sealing flange 42 in the form of a fin or internal wedge, that has a substantially flat wall 43 along one side thereof and an outwardly diverging surface 44 along the opposite side thereof, whereby the sealing flange 42 is generally frusto-conical in configuration. The seal member 45 is also provided with an inclined or generally frusto-conical inner wall surface 45 at one end thereof to facilitate the insertion of the reduced end of the nipple 16 thereinto, as shown in Figure 2.

Slidably mounted within the portion of the flow passage 38 formed in the body section 22 is a check valve 46 that is urged toward an end of the seal member 39 by a coil spring 47, which at one end thereof bears against a spring seat 48 provided by the body section 22, and at its other end seats within a recess therefor defined by an annular collar 49 with which the check valve 46 is equipped. The details of the check valve 46 are seen most clearly in Figure 6, which shows that the collar 49 is generally square-shaped along the outer perimeter thereof, with slightly rounded corners 50 which slidably engage the annular wall of the passage 38 so that open areas 51 exist therebetween and through which fluid may flow. The opposite end of the valve is reduced in cross section, and is bifurcated so as to provide spaced ears 52 and 53 forming a flow passage 54 therebetween. As a result of this construction, fluid may flow from one end to the other of the flow passage 38 when the check valve 46 is open, along the outer walls of the collar 49 (or, more particularly, through the spaces 51 thereabout), and through the port or passage section 54 between the ears.

The quick coupling assembly is used by first retracting the retaining ring 26 along the longitudinal axis of the coupling body against the biasing force exerted by the coil spring 29 so as to bring the enlarged mouth or chamber 37 of the retaining ring into substantial alignment with the locking balls 35. Next, the coupling, which will ordinarily be the movable member in being connected to a flexible hose or flow line, will be moved longitudinally with respect to the connector 10 to insert the nipple 16 into the forward end of the passage 38. The inclined shoulder 20 when it abuts the locking balls 35 will cam them outwardly so that free inward movement of the nipple is not prevented thereby. When the annular seat 19 of the nipple is aligned with the locking balls 35, they will drop thereinto; and the retaining ring 26 may then be released, whereupon it will move forwardly along the body section 23 and into the position shown in Figure 2, which illustrates the connector and coupling so assembled.

An interlocking relation is thus maintained between the connector and coupling, for the locking balls 35 cannot be retracted from the seat 19 because their outer movement is prevented by the adjacent annular wall 36 of the retaining ring. On the other hand, when it is desired to remove the coupling from the connector, the retaining ring 26 is again retracted along the axis of the coupling body, and is moved longitudinally with respect to the connector. Again, the locking balls will be cammed outwardly because of the inclined shoulder or wall portion of the recess 19. It should be noted that the diameter of the reduced end portion 18 of the nipple is slightly less than the diameter of the circle defined by the locking balls 35 when extended into the passage 38, so that the balls then do not touch the reduced end portion of the nipple during insertion or withdrawal thereof.

Therefore, the nipple end is not marred, scratched, or otherwise disfigured during prolonged use of the assembly. However, the portion of the nipple that provides the interlock with the balls 35 is of greater diameter than the remainder of the nipple, and as a consequence, is more durable and much stronger. Further, as will be subsequently described, the enlarged interlocking portion of the nipple does not provide any of the sealing relation between the connector and coupling so that any wear occasioned thereon by its coactive relation with the locking balls 35, does not shorten in any way the effective useful life of the assembly.

When the coupling and connector are separated, as in Figure 1, flow of fluid through the passage 38 is prevented by the check valve 46, which at such time is urged into tight sealing engagement with the seal or gasket member 39. More particularly, the face of the collar 49 bears against the end of the gasket 39, as shown in Figure 1, and the spaced ears 52 and 53 are seated within that end of the gasket. Therefore, fluid cannot flow between the passage portion or port 54 and the spaces or openings 51 between the collar 49 and adjacent surrounding wall of the body section 22. When the nipple 16 is inserted into the passage 38, however, the end of the reduced portion 18 engages the ends of the ears 52 and 53, and pushes the check valve 46 toward the right and ultimately into the position illustrated in Figure 2, at which time the ears are withdrawn from the interior of the seal member 39 so as to open the port 54 and permit the free flow of fluid between it and the open areas 51.

Figure 1 in particular shows that the reduced end 18 of the nipple has an outer diameter that is greater than the opening defined by the sealing flange 42 of the gasket 39 so that the gasket, and especially the sealing flange 42 thereof, is compressed by the nipple upon its insertion. Thus, a tight sealing relation exists between the nipple and gasket, with the result that there is no leakage of fluid therebetween and all of the fluid flow through the assembly is between the passage 38 of the coupling and passage 21 of the connector. There is little wear appearing along the inclined surface 44 of the fin or wedge 42 even though the assembly is connected and disconnected repeatedly because, as has been described before, the outer surface of the nipple 16 throughout the reduced portion thereof does not become disfigured, and does not then tear or mar or otherwise destroy the smooth surface of the sealing flange.

The connection and disconnection of the assembly as heretofore described, has been set forth in a generic sense and without regard to the alignment or polarizing pins 27 of the coupling and corresponding passages 14 of the connector. However, these components perform an important function in the coupling or connection of the assembly, and the operation thereof is illustrated in Figures 3 and 4. It will be noted in Figure 3 that the coupling 11 is rotated slightly with respect to the connector 10 so as to misalign the pins 27 and passages 14. Therefore, when the coupling is moved toward the connector, the pins 27 abut the face of the flange or nut 13 and cause the retaining ring 26 to be retracted along the body of the coupling. The length of the pins is so related to the length of the nipple 16 that when complete retraction of the retaining ring is accomplished, the enlarged portion of the nipple between the inclined cam shoulder 20 and annular recess 19 is in alignment with the locking balls 35.

Therefore, the retaining ring 26 may be rotated with respect to the coupling body, or the entire assembly may be rotated, so as to bring the pins 27 into alignment with the respective passages 14. When alignment occurs, the ring 26 (because of the force imparted thereto by the coil spring 29) attempts to move to its extended position, but cannot do so since the inner edge of the enlarged mouth 37 abuts the locking balls 35. However, the coupling in its entirety may be moved bodily onto the connector 10. Such movement simply aligns the locking balls 35 with the annular recess 19, and when they fall thereinto, the retaining ring 26 snaps into its normal position, which is shown in Figure 2, with the pins 27 extending through the passages 14.

The concave or dished recess 15 provided between the passages 14 affords free rotational movement of the pins 27 along the face of the nut 13, for one of the pins cannot attempt to enter a passage 14 and thereby interfere with further rotation of the retaining ring 26 so long as the other of the pins is bearing against the face of the nut. The opposite condition would be true were the recess 15 omitted.

The modified assembly illustrated in Figures 7 through 9 is for the most part similar in structure and identical in function to the embodiment of the invention heretofore described. The primary difference in function or performance resides in the connector component of the assembly, and comprises a check valve incorporated therein so that the flow of fluid through the connector is prevented when the coupling assembly is disconnected, just as the flow of fluid through the coupling is prevented when the assembly is disconnected. Therefore, the components of the assembly which are substantially the same as those heretofore described, will not be further elaborated on herein, and will be identified in Figures 7 through 9 with the same numerals employed except that each will be primed.

It will be noted that the coupling 11' comprises two sections 22' and 23' that define a continuous passage 38' therethrough, which is threaded at the outer end of the section 22' to accommodate a fitting therein. Also, the section 23' is equipped with a spring biased retaining ring 26' that coacts with locking balls 35' and is held in place on the section by a snap ring 32'. A seal member or gasket 39' is carried by the coupling sections as before explained, and a check valve 46' is slidably mounted within the passage 38' for cooperative sealing engagement with the gasket 39' to close off the passage when the coupling is disassociated from the connector.

The check valve 46' differs somewhat from the check valve 46 in that the collar 49' has openings or ports 55 formed therein to accommodate fluid flow, and the inner end 56 of the valve is a solid member of much smaller diameter than the inner diameter of the gasket 39'. Therefore, when the coupling and connector are separated, the passage 38' is closed off solely through engagement of the flat transverse surface of the valve with the end of the gasket. It will be noted by referring to Figure 9 that the collar 49' of the check valve is square-shaped so as to provide clearance or passages 51' with the surrounding coaxial surface of the body section 22'.

The connector 10' is a sectioned element rather than an integral unit in order to permit ready assembly of the check valve structure therein. For identification, the outer section of the connector is designated with the numeral 10a, and the inner section with the numeral 10b. These sections are threaded externally and internally, respectively, and are secured together preferably with a gasket 57 interposed between abutting surfaces thereof. Another difference from the connector 10 is that the passage 21' is internally threaded so as to receive a fitting. Slidably mounted within the portion of the passage 21' defined by the inner connector section 10b is a check valve 58 that is spring biased toward the right (as viewed in Figure 7) by a helical spring 59, that seats at one end against a terminal surface 60 provided by the connector section 10a, and at its other end against the edge of an annular collar 61 with which the check valve 58 is equipped. The collar 61 has a plurality of openings or ports 62 formed therein and, as shown in Figure 8, is generally square-shaped externally so as to afford areas of substantial clearance with the coaxial passage-defining walls of the connector section 10b.

The connector check valve 58 has a projecting nose 63 along the opposite end thereof that is internally threaded for receiving a pusher button or element 64 adapted to engage the inner end 56 of the coupling check valve 46', as shown in Figure 7. The nose 63 is surrounded by a seal 65 dimensioned so as to be snugly received thereby, and the seal is adapted to cooperate with the inwardly turned end portion 66 of the connector body section 10b in a sealing relation therewith for closing the passage 21' when the connecter and coupling are separated.

In describing the valving functions of the coupling assembly shown in Figures 7 through 9, the relative positions of the components may be first taken as illustrated in Figure 7. The connector 10' and coupling 11' are interlockingly engaged because of the receipt of the locking balls 35' in the annular recess 19', and are held therein by the retaining ring 26'. The nipple 16' sealingly engages the gasket 39' as described with reference to the embodiment of Figures 1 through 6, and the alignment pins 27' are extended through the passages 14'. It will be evident that the end 56 of the coupling check valve is in abutment with the pusher element 64 of the connector check valve; and since both of these valves are spring biased toward each other by coil springs of substantially similar force values, each valve is displaced from its normally closed position wherefore the passage 21' is in open communication with the passage 38' and fluid may flow freely through the assembly.

When the coupling and connector are separated, the coupling check valve 46' is urged into sealing relation with the gasket 39' by the coil spring 47', thereby closing the flow passage 38'. In a similar sense, the seal 65 of the connector check valve 58 is urged into abutting relation with the end 66 of the nipple because of the force exerted by the coil spring 59, thereby closing the passage 21'. As a consequence, the flow of fluid through both the connector and coupling is automatically terminated and prevented whenever they are separated. Conversely, the check valves are automatically opened when the coupling and connector are united to afford a continuous flow passage for fluid therethrough.

The gasket 39' has the same construction as the gasket 39, and sealingly engages the nipple 16' of the connector. The nipple is of reduced diameter, and does not contact the locking balls 35' when being inserted into the coupling and when withdrawn therefrom. Also, the pins 27', and passages 14' which receive the same, function as heretofore described to polarize the connector and coupling elements. The gaskets 39 and 39' and seal 65 are formed from a compressible, resilient material which is relatively soft such as rubber, which may be either natural or synthetic.

In both forms of the invention, the pin indexing or polarizing arrangement prevents undesirable cross-connecting, and the check valve further automatically prevents the escape of gas upon disconnection of the coupling assembly. The soft rubber gasket 39 or 39' stands up for long periods because the connector nipple inserted thereinto does not damage the same since it is not disfigured by the locking balls during insertion and withdrawal. It may be noted also that the gasket is not eroded by the flow of pressure fluid through the assembly, for when the connector and coupling are united, substantially all of the gasket surfaces are covered by the nipple.

Also, the wedge or fin 42 functions to provide a tight seal about the external surface of the nipple, and in that manner accommodates misfitting of the elements due to variations in size and shape thereof, or due to misalignments of the mating parts caused by changing the position of the syrup tanks or other containers with which the coupling is used, which is due to overhanging hoses, accidental bumping, etc. Moreover, if foreign particles or syrup accumulate on the nipple, the fin still presses firmly thereabout to effect a tight sealing relation therewith, and such a tight sealing engagement is a desirable characteristic particularly where relatively expensive fluids, such as carbon dioxide or noxious and odoriferous gases, are employed.

While in the foregoing specification embodiments of the invention have been set forth in considerable detail for purposes of illustration, it will be apparent to those skilled in the art that numerous changes may be made in those details without departing from the spirit and principles of the invention.

I claim:

1. In a quick coupling assembly, a coupling equipped with a retaining ring retractible along a longitudinal axis and having a pin extending outwardly therefrom parallel to such longitudinal axis, and a connector equipped with a flange having a passage therethrough alignable with said pin and dimensioned to pass the same therethrough, said coupling and connector having interconnecting portions defining a flow passage therethrough when the coupling and connector are assembled, said pin being engageable with said flange when the connector and coupling are moved toward each other to retract said retaining ring and thereafter being insertable through said first mentioned passage when aligned therewith to return said retaining ring to its preretracted position after assembly of the coupling and connector.

2. In a quick coupling assembly of the character described, a coupling having a body defining an axially extending flow passage therethrough, a retaining ring carried by said body for axial movement with respect thereto, an indexing pin carried by said retaining ring and extending outwardly therefrom parallel to said flow passage, means for biasing said retaining ring in one axial direction along said body, a connector having an axially extending flow passage therethrough and provided with an indexing passage alignable with said indexing pin for slidably receiving the same therein, and releasable interlocking means provided by said coupling and connector for securing the same together in generally axial alignment, said interlocking means being released when said retaining ring is moved in a direction opposite to the aforesaid one direction and said pin being operative to so move said retaining ring when pressed against a portion of said connector adjacent said indexing passage.

3. The quick coupling structure of claim 2 in which said retaining ring is equipped with a pair of said indexing pins aligned and spaced apart a predetermined distance angularly less than 180°, and in which said connector is provided with a pair of said indexing passages alignable respectively with said pins for receiving the same therein.

4. In a quick coupling assembly of the character described, a connector defining a flow passage extending axially therethrough and being equipped with a nipple, said nipple having a recess in the surface thereof, said connector having also an indexing passage therein extending along the longitudinal axis of said nipple, a coupling body having a flow passage extending longitudinally therethrough and dimensioned at one end thereof to receive said nipple therein, a retaining ring slidably mounted on said coupling body in coaxial relation therewith and having an indexing pin extending outwardly therefrom along the longitudinal axis thereof, said connector being rotatable relative to said pin for selectively aligning and misaligning the same with said indexing passage, and a retractible locking element carried by said body in underlying relation with said retaining ring for insertion into said recess when said nipple is extended into the end of said passage through said body to interconnect said coupling and connector.

5. The structure of claim 4 in which said retaining ring is rotatably carried by said body, and in which spring means are provided for urging said retaining ring in the direction of projection of said indexing pin.

6. The structure of claim 4 in which said nipple has a reduced end portion forwardly of said recess to afford insertion thereof into sealing relationship with said coupling without engagement with said locking element, said seal and locking element being spaced a distance substantially less than the length of said reduced end portion.

7. In a quick coupling assembly, a coupling member having a nipple, a connection having an opening for receiving the nipple, said coupling member, nipple and connector defining a flow passage therethrough when the coupling and connector are assembled, a retaining ring member slidably mounted on said connector for retraction from a resting position, pin means on one of said members, the other of said members having recess means for receiving said pin means, said members being movable with respect to each other for selectively aligning and misaligning the pin means and recess means, said pin means engaging said other member when the connector and coupling are moved toward each other to retract said retaining ring member a predetermined distance from its resting position, and means for returning said retaining ring member to its resting position after assembly of the coupling member and the connector when said pin means and recess means are aligned.

8. In a quick coupling assembly of the character described a connector member defining a flow passage extending axially therethrough and being equipped with a nipple having a reduced end portion, a coupling body having a flow passage extending longitudinally therethrough and dimensioned at one end thereof to receive said nipple therein in guided relationship, sealing means carried by the coupling body in said passage and contacted by said end portion when the body and nipple are engaged, a retaining ring member retractably mounted on said coupling body, one of said members having a pin thereon and the other member a recess for receiving the pin, said members being movable with respect to each other for selectively aligning and misaligning the pin and recess, said pin engaging said other member when misaligned for retracting said retractable member a predetermined distance, valve means normally biased to seat against the other end of said sealing means and displaced by said nipple when said pin and recess are aligned.

9. In a quick coupling assembly of the character described, a connector member defining a flow passage extending axially therethrough and being equipped with a nipple, said nipple having a recess in the surface thereof and a reduced end portion, a coupling body having a flow passage extending longitudinally therethrough and dimensioned at one end thereof to receive said nipple therein, a retaining ring member retractably mounted on said coupling body in coaxial relation therewith, one of said members having a pin thereon and the other member a recess for receiving the pin, said members being movable with respect to each other for selectively aligning and misaligning the pin and recess, said pin engaging said other member when misaligned for retracting said retractable member a predetermined distance, sealing means in the flow passage of the coupling body engaged at one end by said nipple when said retractable member is retracted, valve means normally biased to seat against the other end of said sealing means and displaced by said nipple when said pin and recess are aligned, a retractable locking element carried by said body in underlying relation with said retaining ring member for insertion into said recess when said nipple engages and displaces said valve means.

10. In a quick coupling assembly comprising a coupling and a connector, a coupling body having a passage extending axially therethrough, a gasket constrained within said passage and being provided with an axially oriented opening therethrough, a generally wedge-shaped annular fin spaced from the outer end of the gasket and projecting into said opening and being resilient and compressible, said connector being provided with a nipple insertable into said passage and said opening ahead of said fin in guided relation and being provided with an axially extending flow passage therethrough, said nipple being dimensioned so as to compress said fin when fully inserted into said opening to effect a fluid-tight seal therewith, a retaining ring coaxially mounted on said body for axial slidable movement with respect thereto, yieldable means urging said retaining ring toward the end of said body adapted to receive said nipple therein, an indexing pin rigidly carried by said retaining ring and extending outwardly therefrom in such direction, a body portion provided by said connector and having an indexing passage therein alignable with said pin for slidably receiving the same, releasable interlocking means having elements thereof provided respectively by said coupling and connector for securing the same together, the elements of said interlocking means provided by said coupling being disposed in underlying relation with said retaining ring and being movable into release position when said retaining ring is retracted along said body by said indexing pin engaging said body portion of said connector and displacing said retaining ring for holding said connector and coupling body with the nipple engaging said gasket in guided relationship ahead of said fin, said body portion and retaining ring being rotatable relative to each other to align said pin and indexing passage after such displacement of said retaining ring to permit it to return to its pre-displaced position and the nipple to its fully inserted position.

References Cited in the file of this patent
UNITED STATES PATENTS

| | | |
|---|---|---|
| 2,135,221 | Scheiwer | Nov. 1, 1938 |
| 2,208,620 | Baisch | July 23, 1940 |
| 2,279,146 | Schneller | Apr. 7, 1942 |
| 2,333,423 | Hufferd | Nov. 2, 1943 |
| 2,344,740 | Shaff | Mar. 21, 1944 |
| 2,434,167 | Knoblauch | Jan. 6, 1948 |
| 2,482,029 | Reynolds | Sept. 13, 1949 |
| 2,665,928 | Omon et al. | Jan. 12, 1954 |
| 2,744,770 | Davidson et al. | May 8, 1956 |